(12) United States Patent
Worthoff et al.

(10) Patent No.: US 11,913,346 B2
(45) Date of Patent: *Feb. 27, 2024

(54) MULTIPLE LAYER STRUCTURE

(71) Applicant: General Electric Company, Schenectady, NY (US)

(72) Inventors: Frank Worthoff, West Chester, OH (US); Benjamin James Roby, Fairfield, OH (US); Scott Roger Finn, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 901 days.

This patent is subject to a terminal disclaimer.

(21) Appl. No.: 16/891,665

(22) Filed: Jun. 3, 2020

(65) Prior Publication Data

US 2020/0291812 A1   Sep. 17, 2020

Related U.S. Application Data

(63) Continuation of application No. 15/805,467, filed on Nov. 7, 2017, now Pat. No. 10,711,635.

(51) Int. Cl.
*F01D 21/04* (2006.01)
*F04D 29/52* (2006.01)
(Continued)

(52) U.S. Cl.
CPC .............. *F01D 21/045* (2013.01); *B32B 5/12* (2013.01); *B32B 5/263* (2021.05); *F04D 29/023* (2013.01);
(Continued)

(58) Field of Classification Search
CPC .......... F01D 21/045; F05D 2300/2102; F05D 2300/6012; F05D 2300/603; F05D 2220/36; F05D 2230/50; F05D 2240/14; F04D 29/023; F04D 29/526; B32B 5/12; B32B 5/263; B32B 2260/023; B32B 2262/101; B32B 2262/106; B32B 2307/558;
(Continued)

(56) References Cited

U.S. PATENT DOCUMENTS 4,152,381 A   5/1979  Peterson
4,452,565 A   6/1984  Monhardt et al.
(Continued)

FOREIGN PATENT DOCUMENTS

CN  1680684 A   10/2005
CN  104105848 A  10/2014
CN  105814285 A  7/2016

OTHER PUBLICATIONS

Chinese Patent Office, Office Action re Corresponding Application No. 201811313042.5, dated Oct. 10, 2020, 11 pages, China.
(Continued)

*Primary Examiner* — Camie S Thompson
(74) *Attorney, Agent, or Firm* — McGarry Bair PC (57) ABSTRACT

An apparatus a multiple layer structure having a sub-portion defining an impact zone, and having an inner composite fiber layer, an outer composite fiber layer overlying the inner composite fiber layer, and a woven glass layer, where the inner composite fiber layer, outer composite fiber layer, and the woven glass layer overly the impact zone.

20 Claims, 5 Drawing Sheets

(51) Int. Cl.
*F04D 29/02* (2006.01)
*B32B 5/12* (2006.01)
*B32B 5/26* (2006.01)

(52) U.S. Cl.
CPC ...... *F04D 29/526* (2013.01); *B32B 2260/023* (2013.01); *B32B 2262/101* (2013.01); *B32B 2262/106* (2013.01); *B32B 2307/558* (2013.01); *B32B 2605/18* (2013.01); *F05D 2220/36* (2013.01); *F05D 2230/50* (2013.01); *F05D 2240/14* (2013.01); *F05D 2300/2102* (2013.01); *F05D 2300/603* (2013.01); *F05D 2300/6012* (2013.01)

(58) Field of Classification Search
CPC ....... B32B 2605/18; B32B 5/18; B32B 5/245; B32B 5/02; B32B 2262/00; B32B 2307/542; B32B 2307/732; B32B 9/043; B32B 9/005; B32B 9/046; B32B 3/02; B32B 3/14; B32B 3/18; B32B 25/16; B32B 25/14; B32B 25/20; B32B 1/00; B32B 7/12
USPC ......... 442/218, 219, 181; 415/9, 214.1, 200; 60/226.1, 39.091, 779; 244/53 B
See application file for complete search history.

(56) References Cited

U.S. PATENT DOCUMENTS

| | | |
|---|---|---|
| 5,437,538 A | 8/1995 | Mitchell |
| 6,652,222 B1 | 11/2003 | Wojtyczka et al. |
| 7,018,168 B2 | 3/2006 | Worthoff et al. |
| 8,016,543 B2 | 9/2011 | Braley et al. |
| 8,021,102 B2 | 9/2011 | Xie et al. |
| 8,046,915 B2 | 11/2011 | Xie et al. |
| 8,403,624 B2 | 3/2013 | Xie et al. |
| 8,757,958 B2 | 6/2014 | Lussier |
| 9,032,706 B2 | 5/2015 | Marshall |
| 9,248,612 B2 | 2/2016 | Zhu et al. |
| 10,385,870 B2 | 8/2019 | Crall |
| 10,711,635 B2 * | 7/2020 | Worthoff ............... F01D 21/045 |
| 2012/0251305 A1 | 10/2012 | McMillan |
| 2015/0267556 A1 | 9/2015 | Thomas |
| 2017/0198714 A1 | 7/2017 | Lin et al. |

OTHER PUBLICATIONS

Chinese Patent Office, Office Action re Corresponding Application No. 201811313042.5, dated Mar. 4, 2020, 9 pages, China.

* cited by examiner

MULTIPLE LAYER STRUCTURE

CROSS REFERENCE TO RELATED APPLICATION

This application is a continuation of U.S. patent application Ser. No. 15/805,467 filed Nov. 7, 2017, now U.S. Pat. No. 10,711,635, issued Jul. 14, 2020, which is incorporated herein in its entirety.

BACKGROUND OF THE INVENTION

An aircraft engine, for example a turbine engine, air is drawn into the front of the engine through an inlet, compressed by a compressor, and mixed with fuel in a combustor. The mixture is burned and passes through a turbine. The flow of combustion gas expands through the turbine which in turn spins the shaft and provides power to the compressor. The hot exhaust gases are further expanded through nozzles at the back of the engine, generating powerful thrust, which drives the aircraft forward.

A fan casing can define the inlet and a fan formed by a plurality of blades. Variable conditions exist in which an engine operates. Foreign objects, such as birds, hailstones, ice, sand, and rain may be entrained in the inlet of the engine where impact with portions of the engine can occur, including impact with an interior of the fan casing. In some cases impact may cause a portion of the blade to become torn out which is commonly known as fan blade out. The loose fan blade can impact the interior of the fan casing as well.

The fan casing can be formed in part by composite materials formed to withstand impacts caused by foreign objects or fan blade outs. Depending on the thickness and of the composite material in the fan casing, the composite material can add a significant amount of weight to the engine.

BRIEF DESCRIPTION OF THE INVENTION

In one aspect, the present disclosure relates to a multiple layer structure having a sub-portion defining an impact zone, the multiple layers comprising an inner composite fiber layer, an outer composite fiber layer overlying the inner composite fiber layer; and a woven glass layer sandwiched between the inner and outer composite fiber layers made from fibers having a higher puncture resistance than the fibers used in the inner composite fiber layer or the outer composite fiber layer; wherein the inner composite fiber layer, outer composite fiber layer, and the woven glass layer overly the impact zone, and the outer composite fiber layer abuts the inner composite fiber layer beyond the impact zone.

In another aspect the present disclosure relates to a multiple layer structure having a sub-portion defining an impact zone, the multiple layers comprising an inner composite fiber layer formed from a woven fiber with a weave oriented such that the warp weave direction is in a first direction with respect to the multiple layer structure and the weft weave direction is in a second direction perpendicular to the first direction, an outer composite fiber layer overlying the inner composite fiber layer, and a woven glass layer sandwiched between the inner and outer composite fiber layers, wherein the inner composite fiber layer, outer composite fiber layer, and the woven glass layer overly the impact zone, and the outer composite fiber layer abuts the inner composite fiber layer beyond the impact zone.

DETAILED DESCRIPTION OF THE EMBODIMENTS

The present disclosure is related to a fan casing circumscribing a fan for a turbine engine and having multiple layers and including a sub-portion defining a blade impact zone. For purposes of illustration, the aspects of the disclosure discussed herein will be described with respect to the fan casing for an aircraft turbine engine. It will be understood, however, that the disclosure as discussed herein is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order, and relative sizes reflected in the drawings attached hereto can vary.

Figure 1:
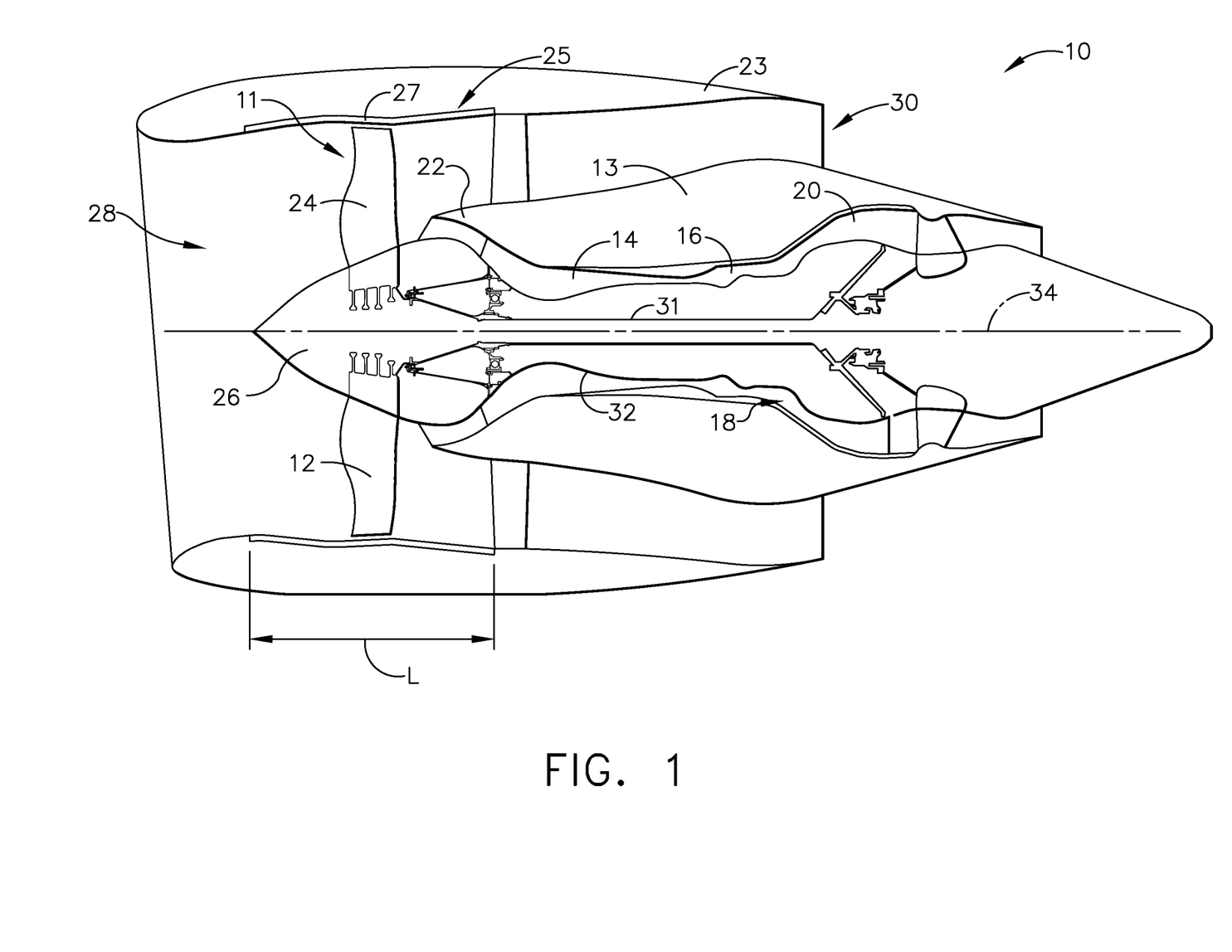
FIG. 1 is a schematic cross-sectional view of a turbine engine.

A turbine engine 10 is illustrated in FIG. 1. The disclosure as discussed herein is not limited to use in a specific turbine engine, and the engine shown in FIG. 1 is for illustrative purposes only. The turbine engine 10 includes a fan assembly 11 and a core engine 13 including a high-pressure compressor 14, a combustor 16, a high-pressure turbine 18, a low-pressure turbine 20, and a booster 22. The fan assembly 11 is surrounded by a multiple layer fan casing 23 and includes a fan 12 having an array of fan blades 24 extending radially outward from a rotor disc 26. The fan assembly 11 can define an axial length (L) of an annular shell 25 comprising an inner composite fiber layer 27 surrounding the fan 12. The engine 10 has an intake side 28 and an exhaust side 30. The fan assembly 11 and the low-pressure turbine 20 are coupled by a first rotor shaft 31, and the high-pressure compressor 14 and the high-pressure turbine 18 are coupled by a second rotor shaft 32.

During operation, air flows through the fan assembly 11, along a central axis 34, and compressed air is supplied to the high-pressure compressor 14. The highly compressed air is delivered to the combustor 16. Airflow (not shown in FIG. 1) from the combustor 16 drives the fan assembly 11 by way of the first rotor shaft 31.

Figure 2:
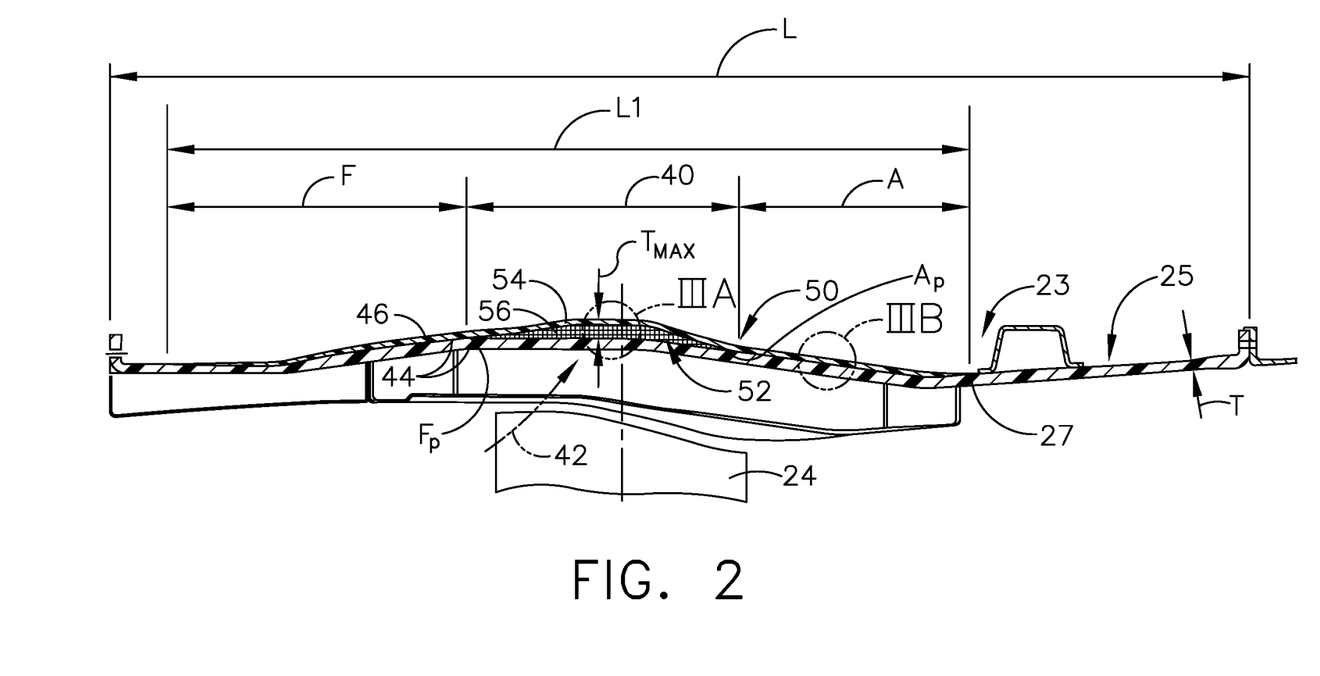
FIG. 2 is an enlarged view of a fan casing for the turbine engine of FIG. 1.

FIG. 2 is an enlarged partial cross-sectional view of the multiple layer fan casing 23 from FIG. 1. The multiple layer fan casing 23 can at least in part define the axial length (L) of the fan assembly 11. More specifically, the length (L) circumscribes a sub-portion of the fan casing defining a blade impact zone 40 of the fan assembly 11. The blade impact zone 40 can be larger or smaller than illustrated and is defined as an axially extending region most likely to receive an impact from fan blade 24 in the event of a fan blade out (FBO). An FBO is when a portion of the fan blade 24 becomes torn out or dislodged from the fan assembly 11, travels along a blade trajectory path 42, and impacts the multiple layer fan casing 23. A blade trajectory path 42 is a path along which a portion of the fan blade 24 would most likely travel in the event of an FBO.

The inner composite fiber layer 27 of the multiple layer fan casing 23 can be co-extensive with the fan casing such that it extends axially through the full length (L). The inner composite fiber layer 27 can extend radially between an inner surface 44 and an outer surface 46 maintaining a constant thickness (T) throughout. A non-limiting example for the inner composite layer 27 is use of a woven fiber. When the inner composite fiber layer 27 is made out of a woven fiber, there can be a constant number of weave layers across the whole length (L). More specifically all wraps extend across the entire length (L), and the weave is oriented such that the warp weave, fibers held stationary in tension, direction is in the circumferential direction of the case and the weft weave, fibers drawn through and inserted over and under the warp weave, direction is in the axial direction of the case. In such a case, thickness changes in the composite fiber layer 27 can be achieved by adding or subtracting warp fibers. The thickness (T) affects the capability, or strength and stiffness, of the inner composite fiber layer 27. An inner composite fiber layer 27 having a greater thickness (T) decreases the axial capability of the annular shell 25 and increases the hoop capability while a lesser thickness (T) increases the axial capability but decreases the hoop capability. A thickness (T) with a warp to weft fiber ratio of between 1:2 and 2:1 optimizes both the axial and hoop capabilities.

Multiple layers 52 form the multiple layer fan casing 23. The inner composite fiber layer 27 is wrapped in additional layers to form an annular casing wrap 50 circumscribing the annular shell 25 along at least a portion of the outer surface 46 of the annular shell 25 inner composite fiber layer 27. The annular casing wrap 50 includes an outer composite fiber layer 54 overlying the inner composite fiber layer 27 with a woven glass layer 56 sandwiched therebetween. Each of the additional layers 54, 56 can be wrapped about the annular shell 25 to form areas of varying thickness in the radial direction with an area of maximum thickness ($T_{MAX}$) located within the blade impact zone 40 where the blade trajectory path 42 intersects the inner surface 44 of the inner composite fiber layer 27.

The outer composite fiber layer 54 abuts the inner composite fiber layer 27 beyond the blade impact zone 40. The outer composite fiber layer 54 can extend axially forward of the blade impact zone 40 to define a forward portion (F) of the annular casing wrap 50. The forward portion (F) extends forward from a contact point (Fp) where the woven glass layer 56 terminates and the composite fiber layer 54 abuts the inner composite fiber layer 27. It is further contemplated that the outer composite fiber layer 54 can extend axially aft from the blade impact zone 40 to define an aft portion (A) of the annular casing wrap 50. The aft portion (A) extends aft from a contact point (Ap) where the woven glass layer 56 terminates and the composite fiber layer 54 abuts the inner composite fiber layer 27. It is contemplated that the forward portion (F) and the aft portion (A) of the multiple layer fan casing 23 include only the inner and outer composite fiber layers 27, 54. The outer composite fiber layer 54 can co-extend with the fan casing 23 such that it is equal to the axial length (L) but greater than the axial extent of the blade impact zone 40. It is further contemplated that the outer composite fiber layer 54 is less than the axial length (L). The outer composite fiber layer 54 can include multiple wraps of layers of carbon fiber material.

Figure 3A:
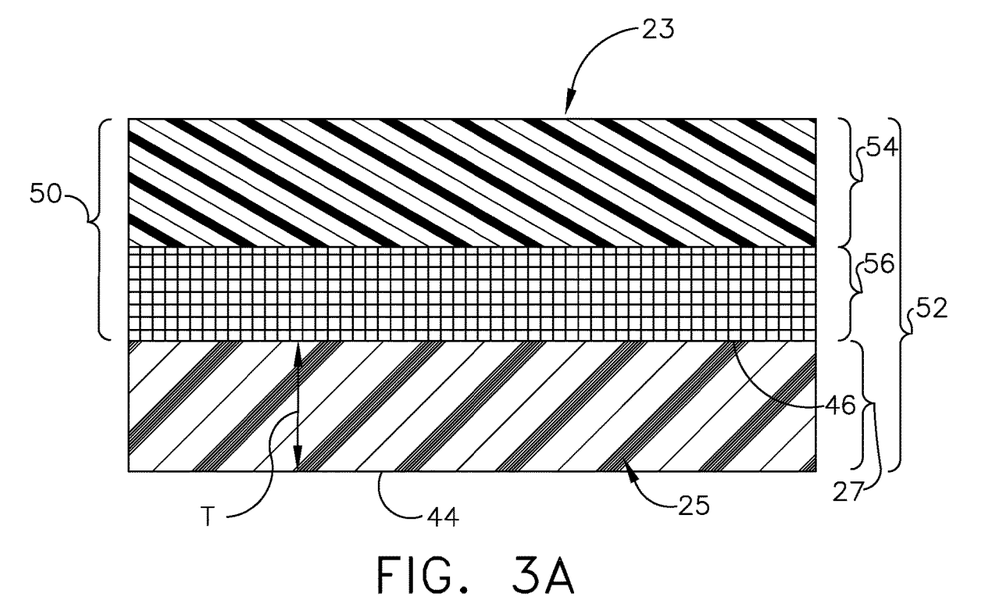
FIG. 3A is a cross-sectional view of a middle portion of the fan casing taken along line IIIA of FIG. 2.

Turning to FIG. 3A, an enlarged view of the blade impact zone 40 is illustrated to more clearly distinguish the multiple layers 52 that form the multiple layer fan casing 23. The woven glass layer 56 can be any type of woven glass fiber, by way of non-limiting example an S2 class fiberglass. It is contemplated that any fiber having a higher puncture resistance than the fibers used in the inner composite fiber layer 27 or the outer composite fiber layer 54, for example R-glass, can be used. A list of such fibers can be found in the ASM Handbook, Vol. 21 Composites. The outer composite fiber layer 54 can be, by way of non-limiting example, an intermediate modulus, IM, type 7 graphite. The outer composite fiber layer 54 can be any carbon fiber suitable for a casing and is not meant to be limited. Both the woven glass layer 56 and the outer composite fiber layer 54 can be formed with varying thickness within the blade impact zone 40 such that the thickness is increased toward the maximum thickness ($T_{MAX}$) while tailoring the hoop and axial capabilities of the multiple layer fan casing 23.

The inner composite fiber layer 27 can be formed by wrapping a woven fiber preform material around the circumference of the case with the woven layer extending across the entire axial length of the case. The layer can be infused with resin and cured using a resin transfer mold (RTM) process to achieve a composite material of a constant thickness (T). By way of non-limiting example, the inner composite fiber layer 27 can be made from carbon fiber that has been woven to form a network of fibers with most fibers in the plane of the weave, but having some fibers extending through the thickness to interlock the fiber layers of the weave. The through-thickness fibers could either extend fully through the thickness to achieve a 3D weave or partially through the thickness to achieve a 2.5 D weave as is described in Structure and Mechanics of Textile Fibre Assemblies, P. Schwartz, Elsevier, 2008. It is also contemplated that the inner composite fiber layer 27 is any textile composite material having a woven, braided, non-crimp fabric for example, but not limited to graphite fiber, glass fiber, ceramic fiber, or aramid polymer fiber.

Figure 3B:
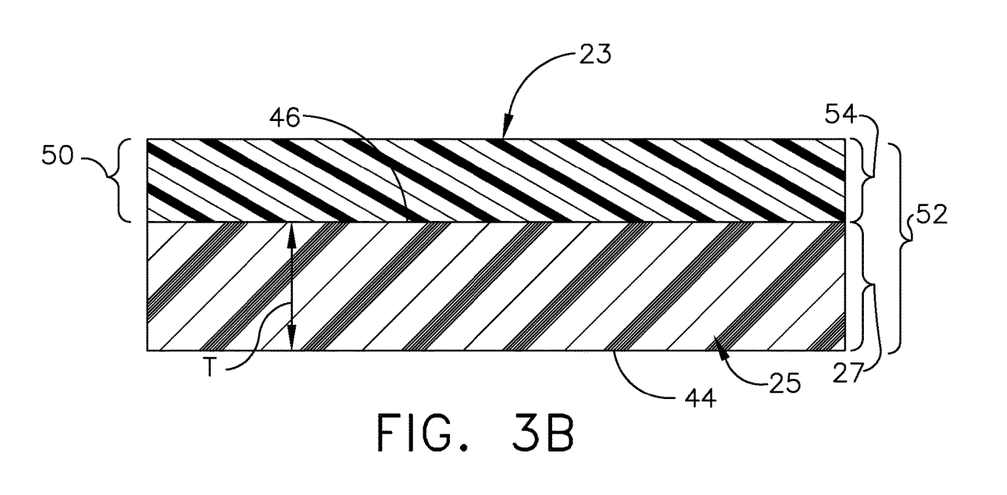
FIG. 3B is a cross-sectional view of an aft portion of the fan casing taken along line IIIB of FIG. 2.

Turning to FIG. 3B, an enlarged view of the aft portion (A) is illustrated to more clearly distinguish the outer composite fiber layer 54 annular shell 25. It should be understood that this enlarged view can also represent the forward portion (F). The inner composite fiber layer 27 has the same thickness (T) as illustrated in FIG. 3A while the annular casing wrap 50 only includes the outer composite fiber layer 54 within the forward portion (F) and aft portion (A).

Figure 4:
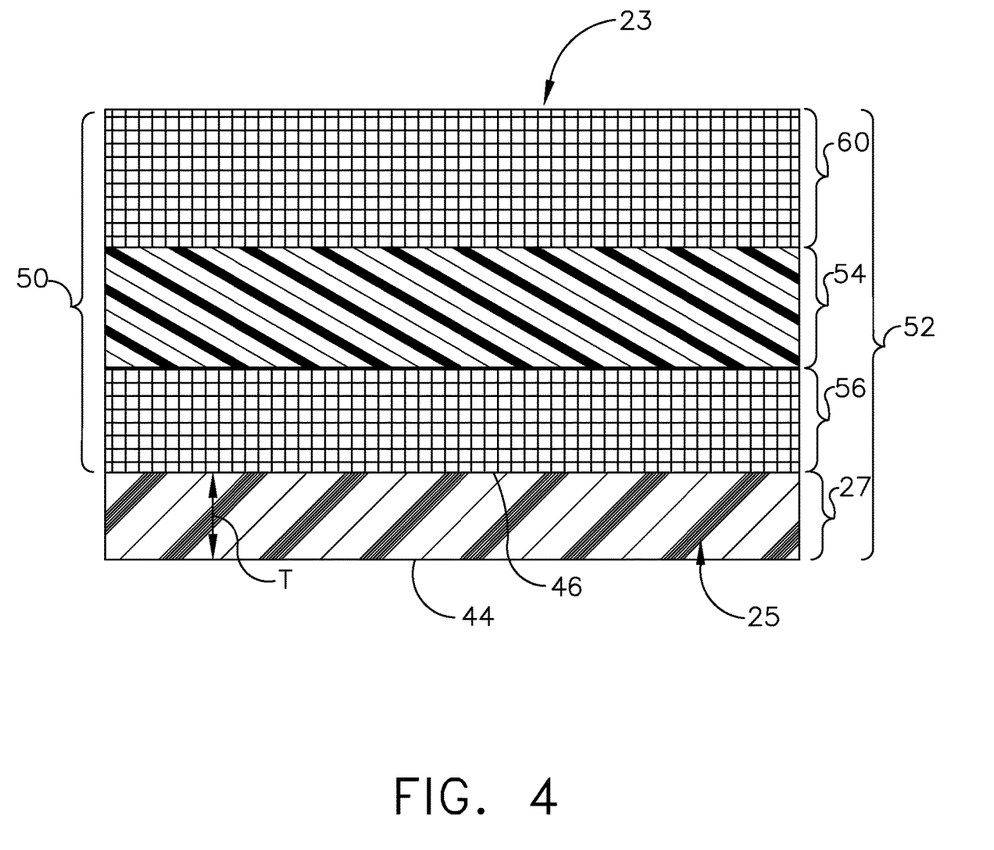
FIG. 4 is a variation of the cross-sectional view of FIG. 3A according to another aspect of the disclosure described herein.

Turning to FIG. 4, it is further contemplated that another layer 60, which can be by way of non-limiting example a woven layer, overlies the outer composite fiber layer 54 to form three distinct layers of materials within the annular casing wrap 50. The other layer 60 can be formed from the same material as the woven glass layer 56, by way of non-limiting example S2 Fiberglass. It is contemplated that the other layer 60 is a different material than the woven glass layer 56, by way of non-limiting example a material with higher elongation capability than carbon such as S-glass, E-glass, Kevlar, or Dyneema. It is further contemplated that the other layer 60 extends along the entire axial length (L1) of the annular ramp such that it is the same length as outer composite fiber layer 54. It is also contemplated that other layer 60 extends into one of the forward portion (F) or aft portion (A) such that the annular casing wrap 50 includes two layers within the forward portion (F) or aft portion (A), where the two layers are the other layer 60 and the inner composite fiber layer 54.

Figure 5:
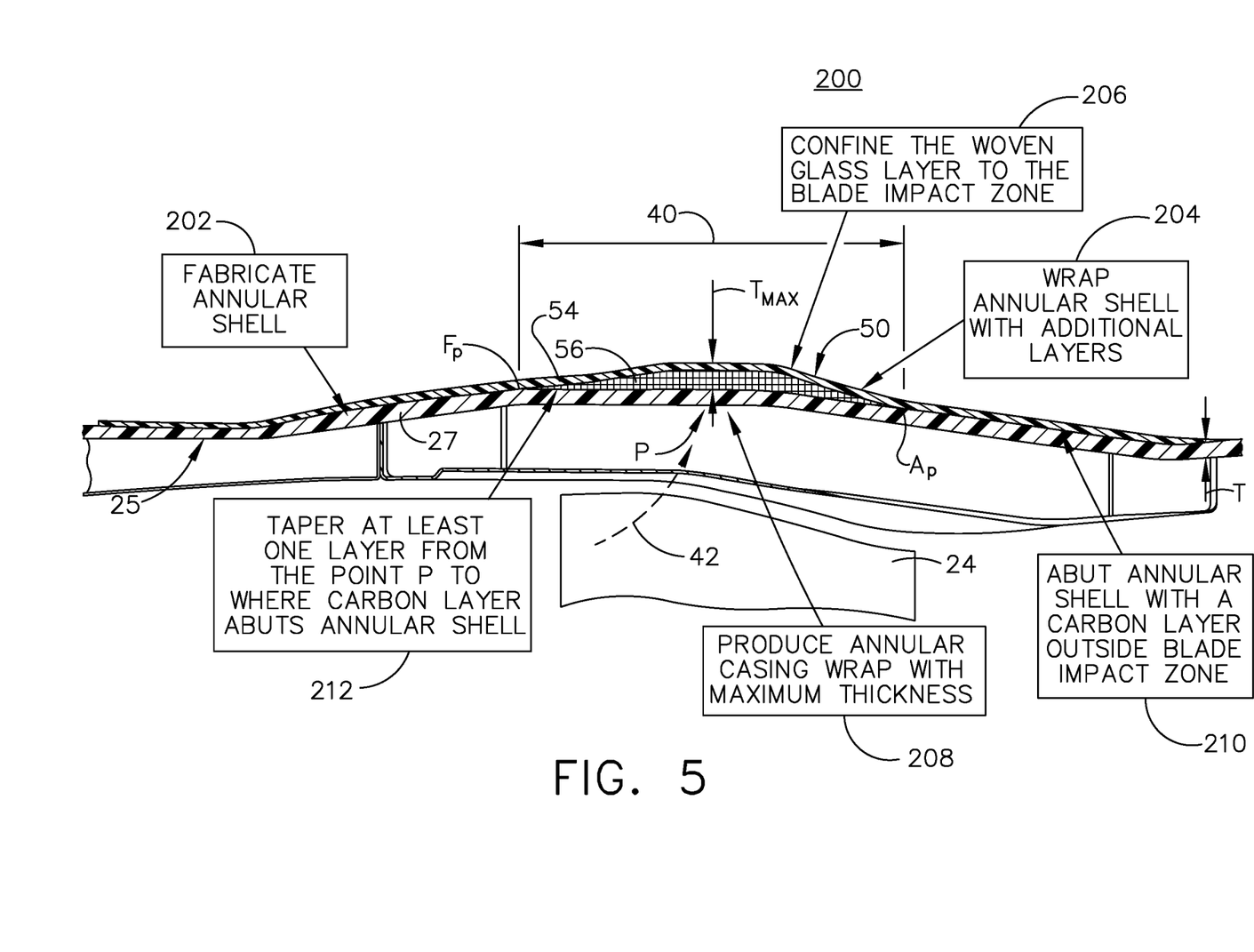
FIG. 5 is an enlarged view of the fan casing of FIG. 2 illustrating a method of fabricating the fan casing according to an aspect of the disclosure described herein.

A method 200 of fabricating the multiple layer fan casing 23 is described below with reference to FIG. 5. The method 200 includes at 202 fabricating the annular shell 25 out of an inner composite fiber layer 27 with a constant thickness (T). At 204, the annular shell 25 is wrapped with the additional layers to form the annular casing wrap 50 including at least one carbon layer, by way of non-limiting example the outer composite fiber layer 54 and at least one woven glass layer, by way of non-limiting example, the woven glass layer 56. It should be understood that forming the multiple layers 52 can include forming another layer 60, as described herein, where the other layer 60 overlays the outer composite fiber layer 54. At 206 the at least one woven glass layer 56 is confined to just the blade impact zone 40. The method further includes at 208 producing a maximum thickness ($T_{MAX}$) of annular casing wrap 50 at a point (P) along the annular shell 25 within the blade impact zone 40. The point (P) is defined as the point where the blade trajectory path 42 intersects the multiple layer fan casing 23.

The method 200 can further include at 210 abutting the at least one carbon layer with the annular shell 25, by way of non-limiting example abutting the inner composite fiber layer 27 with the outer composite fiber layer 54 outside the blade impact zone 40. Finally, the method can also include at 212 tapering at least one of the carbon layer 54 or glass layer 56 from the point (P) to where the outer composite fiber layer 54 abuts the inner composite fiber layer 27. By way of non-limiting example, as illustrated, the woven glass layer 56 of glass is tapered in both the forward and aft direction such that the annular casing wrap 50 forms a substantially trapezoidal shape within the blade impact zone 40.

When compared to a layered casing without additional woven glass layer(s), the annular casing wrap 50 can minimize or eliminate back-side fiber failure. In other words, through holes from blade impacts do not occur in the middle portion of the annular casing wrap 50. During testing, impacts to areas with and without the additional layers are compared to form a baseline damage amount on the inner surface 44. This baseline damage amount is the amount of damage sustained in both areas until the damage beings to increase in one of the areas when compared to each other. Even with kinetic energy increases up to 20% above the baseline damage amount, zero through holes were formed in the blade impact zone 40 of the annular casing wrap 50. Tailoring the annular casing wrap 50 to cover these areas minimizes weight for the multiple layer fan casing 23 and maximizes performance of the multiple layer fan casing 23 during an FBO.

Benefits associated with the fan casing as described herein include a lightweight annular shell conducive to automated manufacturing due to the constant thickness and homogeneous material. Including the plurality of layers within the annular casing wrap facilitates the ability to tailor the thickness of the annular casing wrap to locations where more thickness is needed. The wrapping aspect also enables rapid modification in terms of the placement of the layers. Wrapping the annular shell minimizes any excess weight and localizes necessary thickness in the annular casing wrap.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new examples, whether or not the new examples are expressly described. Combinations or permutations of features described herein are covered by this disclosure. Many other possible embodiments and configurations in addition to that shown in the above figures are contemplated by the present disclosure.

This written description uses examples to disclose aspects of the invention, including the best mode, and also to enable any person skilled in the art to practice aspects of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A multiple layer structure having a sub-portion defining an impact zone, the multiple layers comprising:
   an inner composite fiber layer;
   an outer composite fiber layer overlying the inner composite fiber layer; and
   a woven glass layer sandwiched between the inner and outer composite fiber layers made from fibers having a higher puncture resistance than the fibers used in the inner composite fiber layer or the outer composite fiber layer;
   wherein the inner composite fiber layer, outer composite fiber layer, and the woven glass layer overly the impact zone, and the outer composite fiber layer abuts the inner composite fiber layer beyond the impact zone.

2. The multiple layer structure of claim 1, where the inner composite layer is formed from a woven fiber with a weave oriented such that the warp weave direction is in a first direction with respect to the structure and the weft weave direction is in a second direction perpendicular to the first direction.

3. The multiple layer structure of claim 1, wherein the multiple layer structure extends axially to define a structure axial length and both the inner and outer composite fiber layers extend an axial length equal to the structure axial length.

4. The multiple layer casing of claim 1, wherein the outer composite fiber layer extends an axial length less than the inner composite fiber layer.

5. The multiple layer structure of claim 1, wherein the woven glass layer is coextensive with the impact zone.

6. The multiple layer structure of claim 1, wherein the woven glass layer defines a thickness in a radial direction that varies in an axial direction.

7. The multiple layer structure of claim 6, wherein the woven glass layer tapers from a point where a projectile trajectory path intersects the multiple layer structure until terminating in a point where the outer composite fiber layer abuts the inner composite fiber layer.

8. The multiple layer structure of claim 7, wherein at least one of the inner or outer composite fiber layers has a constant thickness.

9. The multiple layer structure of claim 1, further comprising another layer overlying the outer composite fiber layer.

10. The multiple layer structure of claim 1, wherein at least one of the inner or outer composite fiber layers is a carbon fiber.

11. The multiple layer structure of claim 1, wherein the inner composite fiber layer is a textile composite material.

12. The multiple layer structure of claim 1, wherein the multiple layer structure is a multiple layer casing.

13. A multiple layer structure having a sub-portion defining an impact zone, the multiple layers comprising:
an inner composite fiber layer formed from a woven fiber with a weave oriented such that the warp weave direction is in a first direction with respect to the multiple layer structure and the weft weave direction is in a second direction perpendicular to the first direction;
an outer composite fiber layer overlying the inner composite fiber layer; and
a woven glass layer sandwiched between the inner and outer composite fiber layers;
wherein the inner composite fiber layer, outer composite fiber layer, and the woven glass layer overly the impact zone, and the outer composite fiber layer abuts the inner composite fiber layer beyond the impact zone.

14. The multiple layer structure of claim 13, wherein at least one of the inner and outer composite fiber layers is co-extensive with the multiple layer structure.

15. The multiple layer structure of claim 14, wherein the outer composite fiber layer extends an axial length less than the inner composite fiber layer, and the inner composite fiber layer is co-extensive with the structure.

16. The multiple layer structure of claim 13, wherein the woven glass layer is coextensive with the impact zone.

17. The multiple layer structure of claim 16, wherein the woven glass layer varies in thickness in a radial direction.

18. The multiple layer structure of claim 17, wherein the woven glass layer tapers from a point where a projectile trajectory path intersects the multiple layer structure until terminating in a point where the outer composite fiber layer abuts the inner composite fiber layer.

19. The multiple layer structure of claim 13, wherein the inner composite fiber layer has a constant thickness.

20. The multiple layer structure of claim 13, wherein the multiple layer structure is a multiple layer casing.

* * * * *